(12) United States Patent
Creusy

(10) Patent No.: US 11,888,550 B2
(45) Date of Patent: Jan. 30, 2024

(54) ANTENNA INCLUDING AN NFC COIL AND A POWER COIL THAT ARE MAGNETICALLY COUPLED TOGETHER

(71) Applicant: STMicroelectronics (Rousset) SAS, Rousset (FR)

(72) Inventor: Hugues Creusy, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/845,368

(22) Filed: Jun. 21, 2022

(65) Prior Publication Data
US 2022/0416845 A1 Dec. 29, 2022

(30) Foreign Application Priority Data

Jun. 24, 2021 (FR) ...................................... 2106781

(51) Int. Cl.
*H04B 5/00* (2006.01)
*H02J 50/23* (2016.01)
*H02J 50/27* (2016.01)
*H01Q 7/00* (2006.01)

(52) U.S. Cl.
CPC ............ *H04B 5/0081* (2013.01); *H01Q 7/00* (2013.01); *H02J 50/23* (2016.02); *H02J 50/27* (2016.02); *H04B 5/0037* (2013.01)

(58) Field of Classification Search
CPC .. H02J 50/00; H02J 50/23; H04B 5/00; H04B 5/0081
See application file for complete search history.

(56) References Cited

U.S. PATENT DOCUMENTS

| | | | | |
|---|---|---|---|---|
| 8,922,162 B2* | 12/2014 | Park | .................. | H01F 38/14 320/108 |
| 9,543,653 B2* | 1/2017 | Han | .................. | H02J 7/00045 |
| 9,991,731 B2* | 6/2018 | Ichikawa | ................ | H02J 50/70 |
| 2014/0349572 A1* | 11/2014 | Ben-Shalom | ........ | H04B 5/0031 320/137 |
| 2015/0171519 A1* | 6/2015 | Han | .................. | H02J 50/10 343/720 |
| 2016/0087447 A1* | 3/2016 | Laudebat | ............. | H04B 5/0037 307/104 |
| 2017/0324253 A1* | 11/2017 | Park | ..................... | H04B 5/0037 |
| 2019/0013703 A1* | 1/2019 | Shichino | ................ | H02J 50/60 |
| 2019/0036381 A1* | 1/2019 | Hwang | ................. | H02J 50/12 |
| 2019/0363584 A1* | 11/2019 | Leem | ...................... | H01Q 1/38 |
| 2021/0307149 A1* | 9/2021 | Shi | ......................... | H02J 50/80 |
| 2021/0320535 A1* | 10/2021 | Draak | .................... | H01F 38/14 |

FOREIGN PATENT DOCUMENTS

| | | |
|---|---|---|
| EP | 3501084 A1 | 3/2018 |
| EP | 3611820 A1 | 2/2020 |

OTHER PUBLICATIONS

INPI Search Report and Written Opinion for priority application, FR 2106781, report dated Mar. 25, 2022, 10 pgs.

* cited by examiner

*Primary Examiner* — Adi Amrany
(74) *Attorney, Agent, or Firm* — Crowe & Dunlevy

(57) ABSTRACT

An antenna configured for near field communication includes a first coil for transmitting and receiving signals having a first frequency and a second coil for transmitting and receiving signals having a second frequency greater than at least twice the first frequency. The first and second coils are magnetically coupled with a coupling coefficient greater than 0.5.

18 Claims, 3 Drawing Sheets

ANTENNA INCLUDING AN NFC COIL AND A POWER COIL THAT ARE MAGNETICALLY COUPLED TOGETHER

PRIORITY CLAIM

This application claims the priority benefit of French Application for Patent No. 2106781, filed on Jun. 24, 2021, the content of which is hereby incorporated by reference in its entirety to the maximum extent allowable by law.

TECHNICAL FIELD

The present disclosure relates generally to Near Field Communication (NFC) devices and, more particularly, to transmitting and receiving devices (such as antennas) suitable for near field communication technology.

BACKGROUND

Wireless communication is increasingly used nowadays for various applications such as information exchange, bank payments, energy exchange, etc. There are several types of wireless communication, for example, Near Field Communication (NFC), communications using high frequencies at longer distances such as Bluetooth communications, etc.

It would be desirable to be able to improve at least in part certain aspects of known near field communications, and, more particularly, certain aspects of known transmitting and receiving devices suitable for near field communication technology.

There is a need for near field communication technologies that transmit data and energy.

There is a need for electronic transmitting and receiving devices suitable for near field communication technologies transmitting data and energy.

There is a need for antennas suitable for near field communication technologies transmitting data and energy.

SUMMARY

One embodiment addresses all or some of the drawbacks of known near field communication technologies.

One embodiment addresses all or some of the drawbacks of known electronic devices configured to near field communication technologies.

One embodiment addresses all or some of the drawbacks of known antennas configured to near field communication technologies.

One embodiment provides an antenna adapted for near field communication comprising: a first coil configured to transmit and receive signals having a first frequency; and a second coil configured to transmit and receive signals having a second frequency greater than at least twice the first frequency; wherein the first and second coils are magnetically coupled with a coupling coefficient greater than 0.5.

According to one embodiment, the first coil is positioned on the second coil.

According to one embodiment, the first and second coils are separated by a support.

According to one embodiment, the first coil is mounted on a first side of the support, and the second coil is mounted on a second side of the support on the opposite of the first side of said support.

According to one embodiment, the support is a printed circuit board.

According to one embodiment, the first and second coils are coils each comprising a spirally wound conductive wire.

According to one embodiment, the first and second coils do not have the same number of turns of the conductive wire.

According to one embodiment, the number of turns of the first coil is greater than the number of turns of the second coil.

According to one embodiment, each turn of the coil has a substantially rectangular shape with rounded corners.

Another embodiment provides for an electronic device comprising an antenna described above.

According to one embodiment, the device further comprises at least one first circuit connected to the first coil of the antenna, and at least one second circuit connected to the second coil of the antenna.

According to one embodiment, the first circuit is an energy receiving chain.

According to one embodiment, the second circuit is a data transmission and receiving chain.

Another embodiment provides a method for implementing near field communication between a previously described device and a terminal.

According to one embodiment, when the device and the terminal are exchanging data, the first circuit is deactivated, and when the device and the terminal are exchanging power, the first circuit is activated.

BRIEF DESCRIPTION OF THE DRAWINGS

These and other features and advantages will be set forth in detail in the following description of particular embodiments made on a non-limiting basis in connection with the accompanying figures, among which.

DETAILED DESCRIPTION

Figure 1:
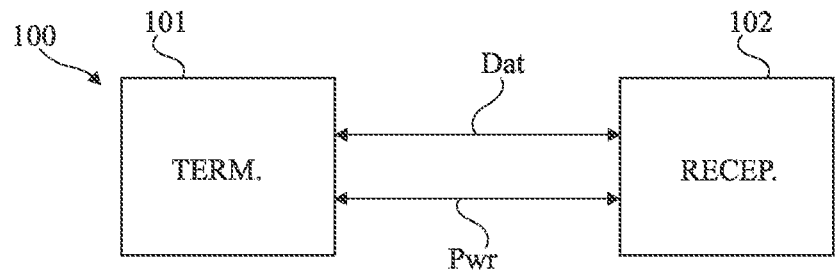
FIG. 1 represents, schematically and in block form, a near field communication between two electronic devices.

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, the computer protocols used by the near field communication technologies are not detailed, since most of the usual protocols are compatible with the embodiments described hereafter, or their adaptation is within the reach of those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Near Field Communication (NFC) technologies enable high frequency, short range communications to be carried out. Such systems exploit a radio frequency electromagnetic field emitted by one device to communicate with another device.

According to the applications, for an NFC communication, one of the devices operates in a so-called terminal or polling mode, while the other operates as a so-called receiver or listening mode, or the two devices communicate in a peer-to-peer (P2P) mode, with the so-called receiver device pairing with the so-called terminal device. Each device includes various electronic circuits for generating a radio frequency (RF) signal transmitted by means of an antenna. The radio frequency field generated by one of the devices is picked up by the other device which is in range and also includes an antenna. When a first NFC device emits an electromagnetic field to initiate communication with a second NFC device, that field is picked up by the second device as soon as it is in range. This field is detected by the circuits of the second device. This results in a variation of the load constituted by the circuits of the second device on the resonant circuit generating the field of the first device. In practice, the corresponding variation in phase or amplitude of the emitted field is detected by the first device, which then initiates an NFC communication protocol with the second device. On the first device side, in practice, it is detected if the amplitude of the voltage across the resonant circuit falls below a threshold or if the voltage across the resonant circuit has a phase shift above a threshold. Once the first device has detected the presence of the second device in its field, it starts a communication establishment procedure, implementing transmissions of requests by the first device and responses by the second device.

FIG. 1 shows schematically a near field communication 100, or wireless communication 100, between two electronic devices: a terminal 101 (TERM) and a receiving device 102 (RECEP), or receiver 102.

The terminal 101 is an electronic device that may be, for example, fixed or mobile. According to one example, the terminal 101 is a wireless charging station, dock, etc. The terminal 101 is equipped with circuits that allow it to exchange not only data but also power with another device through near field communication.

The receiver 102 is a generally mobile electronic device. According to a preferred embodiment, the receiver 102 is a connected device, such as an electronic device in the Internet of Things (IoT) domain. The device 102 comprises various electronic circuits configured to exchange data and power with the terminal 101.

The wireless communication between the terminal 101 and the device 102 is, for example, a near field communication (NFC) type of communication. In this type of communication, the device 102 is positioned within range of the terminal 101 in order to be able to capture the electromagnetic field of the terminal 101. As an example, the device 102 is positioned at a distance generally less than 10 cm from the terminal 101. According to another example, the device 102 is in mechanical contact with the terminal 101.

The terminal 101 and the device 102 use wireless communication 100 to exchange data Dat, and electrical power Pwr. According to one embodiment, the device 102 is configured to use the energy Pwr to recharge at least one of its internal batteries.

Figure 2:
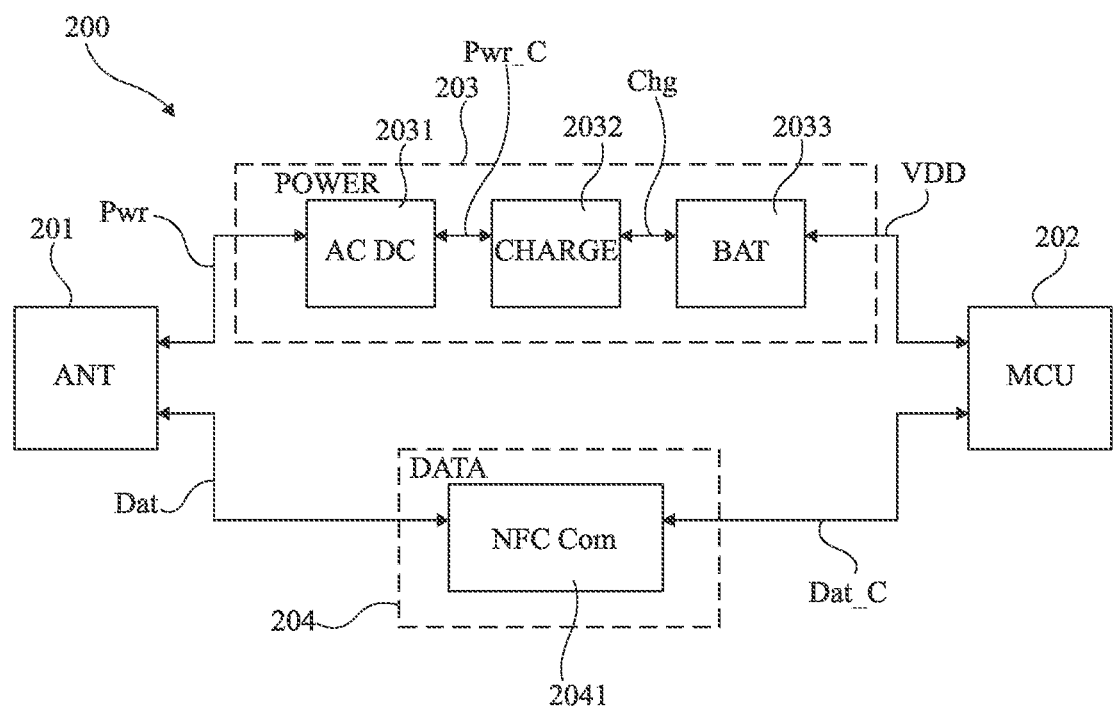
FIG. 2 shows, schematically and in block form, one embodiment of an electronic device.

FIG. 2 illustrates, schematically and in block form, a portion 200 of the receiver 102 described in connection with FIG. 1. The portion 200 comprises circuits of the receiver 102 used when implementing the near field communication 100, or wireless communication 100 described in connection with FIG. 1.

The portion 200 comprises an antenna 201 (ANT) according to one embodiment. The antenna 201 is configured to transmit data Dat and energy Pwr to the rest of the circuits of the portion 200 during the implementation of the near field communication 100. The antenna 201 is described in more detail in connection with FIGS. 3 to 6.

The portion 200 further comprises a microcontroller 202 (MCU) configured to implement the various operations of the receiver 102.

The portion 200 comprises an energy receiving chain 203 (POWER) designated by dotted lines in FIG. 2. According to one example, the chain 203 is particularly configured to use the energy Pwr received by the antenna to charge at least one battery of the receiver 102. According to one example, the chain 203 comprises: a conversion circuit 2031 (AC DC) of the received energy Pwr; a charging circuit 2032 (CHARGE); and at least one battery 2033 (BAT).

According to one example, the conversion circuit 2031 comprises at least one input receiving the energy Pwr. The energy Pwr is, according to one example, an AC electrical power, and the conversion circuit 2031 converts it into a DC electrical power Pwr_C that it provides at one of its output nodes.

According to one example, the charging circuit 2032 comprises at least one input receiving the DC electrical power Pwr_C and at least one output providing a charging electrical power Chg to the battery 2033. The charging circuit 2032 is, for example, an integrated circuit specially configured to the battery 2033, and for controlling the charging phase of the battery 2033.

According to one example, the battery 2033 comprises at least one charging input receiving the electrical power Chg, and at least one output through which it distributes its energy VDD to the receiver circuits 102, such as the microcontroller 202.

The portion 200 further comprises a data transmission and receiving chain 204 (DAT) designated by dotted lines in FIG. 2. According to one example, the chain 202 is particularly configured to receive the data Dat received by the antenna 201 and to transmit them to the microcontroller 202. According to one example, the data Dat are further processed by the chain 204 which then transmits data Dat_C to the microcontroller 202. The chain 204 is, in addition and according to one example, configured to transmit data from the microcontroller 202 to the antenna 201 for transmission via the near field communication 100. The chain 204 comprises a plurality of circuits adapted for near field communication of data. According to one example represented, the chain 204 comprises a near field communication circuit 2041 (NFC Com) configured to exchange data with the antenna 201 and to exchange data with the microcontroller 202. The circuit 2041 is, for example, configured to process the data it receives from the antenna 201 and/or the microcontroller 202. According to one example, the circuit 2041 is an integrated circuit. The circuit 2041 is powered by the battery 2033 through the microcontroller 202.

According to one embodiment, the chains 203 and 204 are not able to receive identical electrical power levels. More particularly, chain 203 is configured to receive higher power levels than the chain 204. Indeed, it is common for near-field communication circuits of the type of circuit 204 to operate with low electrical power to minimally disrupt the radio frequency electromagnetic field used for data transmission. Thus, receiving too much power could corrupt the data received by or cause malfunctions of the communication circuit 2041.

According to one embodiment the communication circuit 2041 is configured to operate "correctly" by receiving signals whose power is less than a threshold power P_th, these signals representing the data Dat, and the circuits of the chain 203 are configured to receive, and to operate, by receiving electrical power higher than the threshold power P_th. According to another point of view, the communication circuit 2041 is configured to operate "correctly" by receiving signals whose voltage is less than a threshold voltage V_th, and the circuits of the chain 203 are configured to receive, and operate, by receiving electrical power whose voltage is greater than the threshold voltage V_th. According to one example, the threshold voltage is of the order of 5 V.

The antenna 201, whose operation is described below, is configured to protect the communication circuit 2041 when the chain 203 receives a power Pwr whose voltage is higher than V_th.

Figure 3:
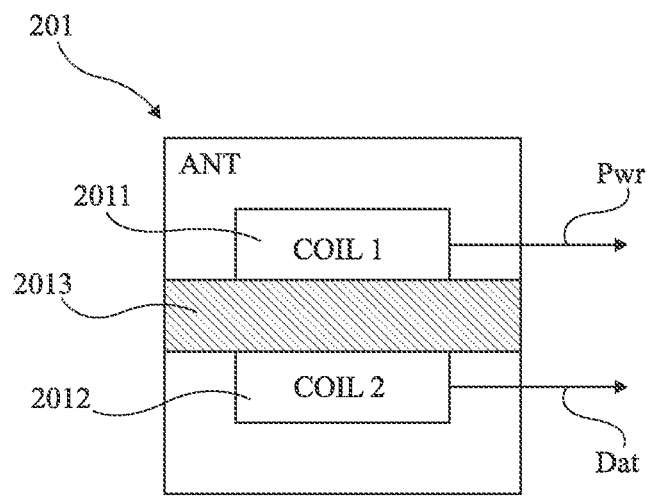
FIG. 3 shows, schematically and in block form, a cross-sectional view of an antenna of the electronic device of FIG. 2.

FIG. 3 illustrates, very schematically and in block form, a cross-sectional view of the antenna 201 (ANT) described in connection with FIG. 2.

The antenna 201 comprises two coils 2011 (COIL 1) and 2012 (COIL 2).

The coil 2011 is configured to serve as an antenna in connection with transmitting and receiving signals with a frequency F1 adapted for near field communication, or NFC communication. This means that the resonant frequency of the circuit formed by the 2011 coil and the circuit to which the 2011 coil is connected is equal to the frequency F1. There are different NFC communication protocols defining the value of this frequency F1, and it is usually around 13.56 MHz. It is obvious in other contexts that the coil 2011 could be configured to operate at another frequency.

In addition, the coil 2011 is connected and configured to transmit power Pwr to the chain 203. The coil 2011 is not connected to the chain 204.

The coil 2012 is configured to serve as an antenna in connection with transmitting and receiving signals whose frequency F2 is different from the frequency F1 of the signals related to the coil 2011. This means that the resonant frequency of the circuit formed by the coil 2012 and the circuit to which coil 2012 is connected is equal to the frequency F2. The frequencies F1 and F2 are quite far apart from each other, and according to one embodiment, the frequency F2 is at least twice the frequency F1. According to one example, the coil 2012 is configured to transmit and receive signals having a frequency of the order of 60 MHz.

In addition, the coil 2012 is connected to the chain 204. The coil 2012 is not connected to the chain 203.

According to one embodiment, the coils 2011 and 2012 are magnetically coupled together, with a coupling coefficient K greater than 0.5, for example greater than 0.6. A coupling coefficient of two coils ranges from zero to one and represents the fraction of magnetic flux produced by the current in one coil that couples it to the other coil.

To achieve a coupling coefficient of this order, the coils 2011 and 2012 are, for example, arranged parallel and spatially on top of each other. According to one example of an embodiment, the coil 2011 is positioned on the coil 2012. According to one example, the coils 2011 and 2012 are each mounted on one side of a substrate or support 2013. The support 2013 is, for example, a Printed Circuit Board (PCB) with a thickness of less than 2 mm, for example of the order of 0.4 or 0.8 mm.

The operation of the antenna 201, consisting of the magnetically coupled coils 2011 and 2012, then presents two distinct operating phases.

In a first operating phase, the antenna 201 is configured to receive data signals to be transferred to the chain 204. When the impedance of the receiving chain 203 is high, for example when the recharging of the battery 2033 is deactivated, the quality factor of the coil 2011 is high and the coil 2012 is configured to receive signals of frequency F1.

In a second operating phase, the antenna 201 is configured to receive power to be transferred to the chain 203. When the impedance of the receiving chain 203 is low, for example when recharging the battery 2033, the quality factor of the coil 2011 is low and the coil 2012 is configured to operate as an antenna for signals of frequency F2.

As a result, when the impedance of the power receiving chain is high, the receiver 102 can receive data, and when the impedance of the receiving chain 203 is low, the receiver 102 can receive a higher-powered signal of frequency F1.

The operation of the antenna 201 is described in greater detail using the following notations: j shows the imaginary unit; ω is the pulsation of the received signal; K is the coupling coefficient between the coils 2011 and 2012; $Z_{COIL1}$ represents the impedance of the coil 2011; $L_{COIL1}$ represents the inductive component of the impedance $Z_{COIL1}$ of the coil 2011; $Z_{COIL2}$ represents the impedance of the coil 2012; $R_{COIL2}$ represents the resistive component of the impedance $Z_{COIL2}$ of coil 2012; $L_{COIL2}$ represents the inductive component of the impedance $Z_{COIL2}$ of the coil 2012; and $Z_{CHARGE}$ represents the impedance of the receiving chain 203.

The impedance of the coil 2012 is then given by the following mathematical formula:

$$Z_{COIL2} = R_{COIL2} + jL_{COIL2}\omega + K^2 \frac{L_{COIL1} * L_{COIL2}}{(Z_{COIL1} + Z_{CHARGE})}$$

During a communication phase, a signal of frequency F1 received by the antenna 201 represents the data and has a voltage lower than the threshold voltage V_th, and the power receiving chain 203 is deactivated. When these conditions are met, the energy receiving chain 203 has a relatively high impedance $Z_{CHARGE}$. The coil 2011 connected to the energy receiving chain 203 is then equivalent to an RLC circuit with a high quality factor and a resonant frequency close to the frequency F1. The coupling between the two coils 2011 and 2012 being favored by their spatial arrangement, the inductance of the coil 2012 increases so that it can also receive the signal of frequency F1. As the charging circuit is deactivated, the signal of frequency F1 is directed only to the data transmission and receiving chain 204, this signal having a voltage lower than the threshold voltage V_th, it will not damage the circuits of the chain 204.

During a charging phase of the battery 2033, a signal of frequency F1 received by the antenna 201 represents an electrical power whose voltage can be higher than V_th. This signal is to be supplied to the energy receiving chain 203 and may be harmful to the circuits of the data transmission and receiving chain 204. During a charging phase of the battery 2033, the charging circuit 2032 is activated, and the impedance $Z_{CHARGE}$ of the chain 203 is relatively low. The coil 2011 connected to the energy receiving chain 203 is then equivalent to an RLC circuit of relatively low quality factor. The coupling between the two coils 2001 and 2012 is still favored by their spatial arrangement, but the inductance of the coil 2012 is unchanged so that the coil 2012 is not able to receive the signal of frequency F1. Thus, the coil 2012, not receiving the signal of frequency F1, cannot supply the chain 204 with the signal whose voltage is likely to damage it. The circuits of the chain 203 are therefore protected.

Figure 4:
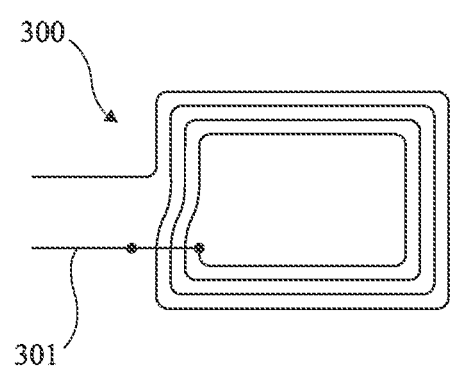
FIG. 4 shows, schematically, a top view of a coil used by the antenna of FIG. 3.

FIG. 4 is a schematic top view of a coil 300.

The coil 300 is a coil that can be used as a 2011 coil or as a 2012 coil in the antenna 201 described in connection with FIG. 1, as described in relation to FIG. 5.

The coil 300 consists of a conductive wire 301. Unlike conventional cylindrical coils, the coil 300 is flat in shape, and the conductive wire 301 is wound in a concentric spiral. According to one example of the embodiment, each turn of the spiral is substantially rectangular in shape with rounded corners but could be circular or substantially circular in shape.

The ends of the conductive wire 301 form the connection nodes of the coil 300 and are made accessible on one side of the coil.

Figure 5:
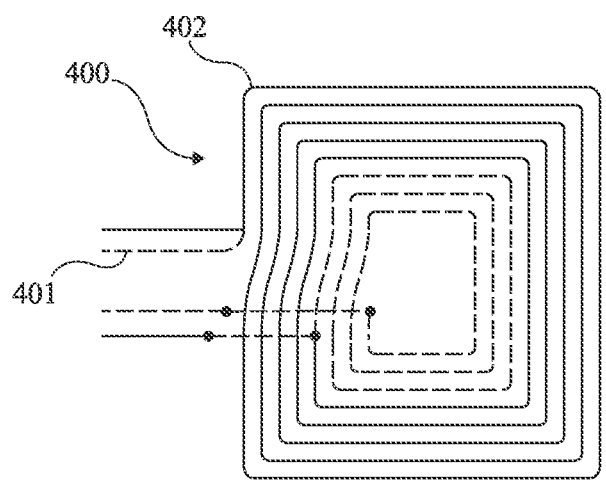
FIG. 5 shows, schematically, a top view of one embodiment of the antenna of FIG. 3.

FIG. 5 is a schematic top view of one example of an embodiment of an antenna 400 of the type of antenna 201 described in relation to FIG. 3.

The antenna 400 comprises two coils 401 and 402 both of the type of coil 300 described in relation to FIG. 4. More particularly, the coils 401 and 402 are both composed of a concentrically spiral wound conductive wire and are relatively flat.

As described in relation to FIG. 3, the coils 401 and 402 are positioned one above the other and may be separated by a substrate or support. This support is not represented in FIG. 5. The coil 401 is positioned on top of the coil 402, which is represented as a dotted line.

According to one embodiment, the coils 401 and 402 differ from each other in the number of turns formed by their conductive wire. According to one example, the coil 402 has more turns than the coil 401. According to one example, the coil configured to receive the energy to be transmitted to the energy receiving chain of the receiving device comprises more turns than the coil configured to receive data to be transmitted to the data transmitting and receiving chain of the receiving device.

Figure 6:
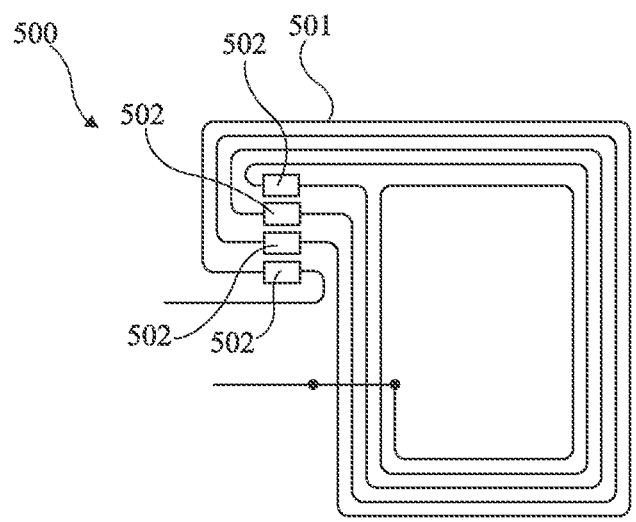
FIG. 6 shows, schematically, a top view of another coil that can be used by the antenna of FIG. 3.

FIG. 6 is a schematic top view of another coil 500.

The coil 500 is similar to the coil 300 described in connection with FIG. 3. The common elements of coils 300 and 500 are not described again, and only their differences are highlighted. For example, coil 500 comprises a spirally wound conductive wire 501.

Unlike coil 300, coil 500 has an electronically selectable number of turns. To this end, the coil comprises switches 502 positioned along the conductive wire 501.

The coil 500 can be used in an antenna of the type of the antenna 201 described in connection with FIG. 3, for example by being associated to another coil 500, or to a coil of the type of the coil 300.

Various embodiments and variants have been described. Those skilled in the art will understand that certain features of these embodiments can be combined and other variants will readily occur to those skilled in the art. In particular, the person skilled in the art may implement the antenna of FIG. 3 using coils having a different shape than the coils of FIGS. 4 and 6.

Finally, the practical implementation of the embodiments and variants described herein is within the capabilities of those skilled in the art based on the functional description provided hereinabove.

The invention claimed is:

1. A near field communications receiver device, comprising:
   receiver circuitry;
   wherein said receiver circuitry comprises a power receiving circuit and a data communications receiving circuit; and
   an antenna coupled to the receiver circuitry and configured to receive a signal having a first frequency;
   wherein said antenna comprises:
      a first coil electrically connected to the power receiving circuit but not to the data communications receiving circuit, and where a resonant frequency of a circuit formed by the first coil and the power receiving circuit is equal to the first frequency; and
      a second coil electrically connected to the data communications receiving circuit but not to the power receiving circuit, and where a resonant frequency of a circuit formed by the second coil and the data communications receiving circuit is equal to a second frequency greater than at least twice the first frequency when the power receiving circuit is activated and is equal to the first frequency when the power receiving circuit is deactivated;
   wherein the first and second coils are magnetically coupled with a coupling coefficient greater than 0.5;
   wherein the circuitry is configured, in a first operating phase to receive data for transfer to the data communications receiving circuit, to deactivate the power receiving circuit to produce an increased impedance of the power receiving circuit and cause, through the magnetic coupling of the first and second coils, a change in impedance of the second coil so that the second coil is configured to receive signals at the first frequency; and
   wherein the circuit is further configured, in a second operating phase to receive power for transfer to the power receiving circuit, to activate the power receiving circuit to produce a decreased impedance of the power receiving circuit.

2. The device according to claim 1, wherein the first coil is positioned over the second coil.

3. The device according to claim 1, wherein the first and second coils are separated by a support.

4. The device according to claim 1, wherein each coil of the first and second coils comprises a spirally wound conductive wire.

5. The device according to claim 4, wherein the first and second coils do not have a same number of turns of the spirally wound conductive wire.

6. The device according to claim 5, wherein a number of turns of the spirally wound conductive wire for the first coil is greater than a number of turns of the spirally wound conductive wire for the second coil.

7. The device according to claim 1, wherein the first frequency is a near field communications (NFC) frequency of 13.56 MHz.

8. The device according to claim 7, wherein the second frequency is of the order of 60 MHz.

9. The device according to claim 1, wherein the signal having the first frequency is a signal for data transfer in the first operating phase and wherein the signal having the first frequency is a signal for power transfer in the second operating phase.

10. A near field communications (NFC) receiver, comprising:
- a first antenna tuned to an NFC communications frequency;
- a second antenna tuned to a further frequency that is at least two times said NFC communications frequency;
- wherein the first antenna and the second antenna are magnetically coupled with a coupling coefficient greater than 0.5;
- a power receiving circuit electrically connected to the first antenna, but not the second antenna, where a resonant frequency of a circuit formed by the first antenna and the power receiving circuit is equal to the NFC communications frequency in a second operating phase for the NFC receiver to receive power for transfer to the power receiving circuit; and
- an NFC data communications circuit electrically connected to the second antenna, but not the first antenna, where a resonant frequency of a circuit formed by the second antenna and the NFC data communications circuit is equal to the further frequency in the second operating phase and is equal to the NFC communications frequency in a first operating phase for the NFC receiver to receive data for transfer to the NFC data communications circuit;
- wherein, in the first operating phase, the power receiving circuit is deactivated to produce an increased impedance of the power receiving circuit, the increase impedance causing, through the magnetic coupling of the first antenna and second antenna, an increase in an inductance of the second antenna so that the second antenna is configured to receive data transfer signals at the NFC communications frequency.

11. The NFC receiver of claim 10, wherein, in the second operating phase, the power receiving circuit is activated to produce a decreased impedance of the power receiving circuit so that the first antenna is configured to receive power transfer signals at the NFC communications frequency.

12. The NFC receiver of claim 10, wherein the first antenna is positioned over the second antenna.

13. The NFC receiver of claim 10, wherein the first antenna and second antenna are separated by a support.

14. The NFC receiver of claim 10, wherein each the first antenna and second antenna comprises a spirally wound conductive wire.

15. The NFC receiver of claim 14, wherein the first antenna and second antenna a different number of turns of the spirally wound conductive wire.

16. The NFC receiver of claim 15, wherein a number of turns of the spirally wound conductive wire for the first antenna is greater than a number of turns of the spirally wound conductive wire for the second antenna.

17. The NFC receiver of claim 10, wherein the NFC communications frequency is 13.56 MHz.

18. The NFC receiver of claim 17, wherein the further frequency is of the order of 60 MHz.

* * * * *